(12) United States Patent
Sims et al.

(10) Patent No.: US 9,656,186 B2
(45) Date of Patent: *May 23, 2017

(54) FLUID DEGASSING APPARATUS

(71) Applicant: IDEX Health & Science, LLC, Rohnert Park, CA (US)

(72) Inventors: Carl Sims, Santa Rosa, CA (US); Yuri Gerner, Mendota Heights, MN (US); Quan Liu, Petaluma, CA (US)

(73) Assignee: IDEX Health and Science, LLC, Rohnert Park, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/725,037

(22) Filed: May 29, 2015

(65) Prior Publication Data

US 2015/0265945 A1 Sep. 24, 2015

Related U.S. Application Data

(63) Continuation of application No. 13/611,420, filed on Sep. 12, 2012, now Pat. No. 9,044,712.
(Continued)

(51) Int. Cl.
*B01D 19/00* (2006.01)
*B01D 53/22* (2006.01)
(Continued)

(52) U.S. Cl.
CPC ......... *B01D 19/0031* (2013.01); *B01D 63/02* (2013.01); *B01D 63/06* (2013.01);
(Continued)

(58) Field of Classification Search
CPC .... B01D 19/0031; B01D 63/02; B01D 63/06; B01D 71/26; B01D 71/34; B01D 71/36; B01D 2313/23
See application file for complete search history.

(56) References Cited

U.S. PATENT DOCUMENTS 3,668,837 A 6/1972 Gross
3,751,879 A * 8/1973 Allington ........... B01D 19/0031
128/205.12
(Continued)

FOREIGN PATENT DOCUMENTS

CA 2268641 1/2001
EP 0649676 4/1995
(Continued)

OTHER PUBLICATIONS

"Gas and Vapor Transport Properties of Amorphous Perfluorinated Copolymer Membranes based on 2,2-bistrifluoromethyl-4, 5-difluoro-1, 3-dioxole/tetrafluoroethylene", Pinnau et al., Journal of Membrane Science 109 (1996) p. 125-133.
(Continued)

*Primary Examiner* — Jason M Greene
(74) *Attorney, Agent, or Firm* — Haugen Law Firm PLLP

(57) ABSTRACT

An elongated flow-through degassing apparatus includes an elongated gas permeable outer shell and one or more gas-permeable, liquid-impermeable elongated inner conveyance members extending within the outer shell and at least partially through a chamber defined within the outer shell. The apparatus also includes inlet and outlet junctions for securing the outer shell to the inner conveyance member. The outer shell exhibits a first permeance that is substantially greater than a second permeance of the inner conveyance member. The degassing apparatus may be sufficiently flexible so as to be readily manipulatable into desired configurations.

10 Claims, 3 Drawing Sheets

Related U.S. Application Data

(60) Provisional application No. 61/533,429, filed on Sep. 12, 2011.

(51) Int. Cl.
- B01D 69/04 (2006.01)
- B01D 63/02 (2006.01)
- B01D 63/06 (2006.01)
- B01D 71/26 (2006.01)
- B01D 71/34 (2006.01)
- B01D 71/36 (2006.01)

(52) U.S. Cl.
CPC ............ *B01D 71/26* (2013.01); *B01D 71/34* (2013.01); *B01D 71/36* (2013.01); *B01D 2313/23* (2013.01)

(56) References Cited

U.S. PATENT DOCUMENTS

| | | |
|---|---|---|
| 4,133,767 A | 1/1979 | Bakalyar et al. |
| 4,230,463 A | 10/1980 | Henis et al. |
| 4,268,279 A | 5/1981 | Shindo et al. |
| 4,325,715 A | 4/1982 | Bowman et al. |
| 4,364,759 A | 12/1982 | Brooks et al. |
| 4,430,098 A | 2/1984 | Bowman et al. |
| 4,469,495 A | 9/1984 | Hiraizumi et al. |
| 4,598,049 A | 7/1986 | Zelinka et al. |
| 4,643,713 A | 2/1987 | Viitala |
| 4,729,773 A | 3/1988 | Shirato et al. |
| 4,754,009 A | 6/1988 | Squire |
| 4,781,837 A | 11/1988 | Lefebvre |
| 4,834,877 A | 5/1989 | Peters et al. |
| 4,840,819 A | 6/1989 | Williams et al. |
| 4,844,871 A | 7/1989 | Polschegg |
| 4,923,679 A | 5/1990 | Fukasawa et al. |
| 4,938,778 A | 7/1990 | Ohyabu et al. |
| 4,948,851 A | 8/1990 | Squire |
| 4,986,837 A | 1/1991 | Shibata |
| 4,994,180 A | 2/1991 | Sims et al. |
| 5,051,113 A | 9/1991 | Nemser |
| 5,051,114 A | 9/1991 | Nemser et al. |
| 5,098,566 A | 3/1992 | Lefebvre |
| 5,100,555 A | 3/1992 | Matson |
| 5,116,650 A | 5/1992 | Bowser |
| 5,147,417 A | 9/1992 | Nemser |
| 5,183,486 A | 2/1993 | Gatten et al. |
| 5,205,844 A | 4/1993 | Morikawa |
| 5,238,471 A | 8/1993 | Blanchet-Fincher |
| 5,254,143 A | 10/1993 | Anazawa et al. |
| 5,258,202 A | 11/1993 | Pellegrino et al. |
| 5,281,255 A | 1/1994 | Toy et al. |
| 5,290,340 A | 3/1994 | Gatten et al. |
| 5,340,384 A | 8/1994 | Sims |
| 5,382,365 A | 1/1995 | Deblay |
| 5,383,483 A | 1/1995 | Shibano |
| 5,425,803 A | 6/1995 | van Schravendijk et al. |
| 5,522,917 A | 6/1996 | Honda et al. |
| 5,523,118 A | 6/1996 | Williams |
| 5,526,641 A | 6/1996 | Sekar et al. |
| 5,531,904 A | 7/1996 | Grisham et al. |
| 5,554,414 A | 9/1996 | Moya et al. |
| 5,584,914 A | 12/1996 | Senoo et al. |
| 5,636,619 A | 6/1997 | Poola et al. |
| 5,649,517 A | 7/1997 | Poola et al. |
| 5,678,526 A | 10/1997 | Cullen et al. |
| 5,749,942 A | 5/1998 | Mattis et al. |
| 5,762,684 A | 6/1998 | Hayashi et al. |
| 5,772,736 A | 6/1998 | van Schravendijk et al. |
| 5,788,742 A | 8/1998 | Sugimoto et al. |
| 5,824,223 A | 10/1998 | Michaels et al. |
| 5,876,604 A | 3/1999 | Nesmer et al. |
| 5,902,747 A | 5/1999 | Nemser et al. |
| 5,914,154 A | 6/1999 | Nemser |
| 5,938,928 A | 8/1999 | Michaels |
| 5,989,318 A | 11/1999 | Schroll |
| 6,033,475 A | 3/2000 | Hasebe et al. |
| 6,221,247 B1 | 4/2001 | Nemser et al. |
| 6,248,157 B1 | 6/2001 | Sims et al. |
| 6,299,777 B1 | 10/2001 | Bowser |
| 6,309,444 B1 | 10/2001 | Sims et al. |
| 6,315,815 B1 | 11/2001 | Spadaccini et al. |
| 6,379,796 B1 | 4/2002 | Uenishi et al. |
| 6,469,116 B2 | 10/2002 | Maccone et al. |
| 6,478,852 B1 | 11/2002 | Callaghan et al. |
| 6,494,938 B2 | 12/2002 | Sims et al. |
| 6,540,813 B2 | 4/2003 | Nelson et al. |
| 6,569,341 B2 | 5/2003 | Bowser |
| 6,582,496 B1 | 6/2003 | Cheng et al. |
| 6,675,835 B2 | 1/2004 | Gerner et al. |
| 6,770,202 B1 | 8/2004 | Kidd et al. |
| 6,837,992 B2 | 1/2005 | Gerner et al. |
| 6,949,132 B2 | 9/2005 | Thielen et al. |
| 6,955,758 B2 | 10/2005 | Yamazaki et al. |
| 7,144,443 B2 | 12/2006 | Gerner et al. |
| 7,713,331 B2 | 5/2010 | Gerner et al. |
| 8,596,467 B2 | 12/2013 | Krause et al. |
| 9,044,712 B2* | 6/2015 | Sims et al. ......... B01D 19/0031 |
| 2001/0025819 A1 | 10/2001 | Bowser |
| 2003/0116491 A1 | 6/2003 | Yamazaki et al. |
| 2003/0192428 A1 | 10/2003 | Cheng et al. |
| 2004/0238343 A1 | 12/2004 | Kuo et al. |
| 2007/0095204 A1 | 5/2007 | Gerner et al. |
| 2010/0218679 A1* | 9/2010 | Hekmat ............ B01D 19/0031 96/6 |
| 2012/0024784 A1 | 2/2012 | Clark et al. |
| 2012/0204726 A1 | 8/2012 | McAdams et al. |
| 2012/0247338 A1 | 10/2012 | Bauer et al. |
| 2012/0291627 A1 | 11/2012 | Tom et al. |

FOREIGN PATENT DOCUMENTS

| | | |
|---|---|---|
| EP | 0641591 | 1/2000 |
| JP | 403221130 | 9/1991 |
| JP | 403224602 | 10/1991 |
| JP | 405068808 | 3/1993 |
| SU | 871806 | 10/1931 |
| WO | 9015662 | 12/1990 |

OTHER PUBLICATIONS

"The Role of Dissolved Gases in High-Performance Liquid Chromatography", Bakalar et al., Journal of Chromatography, 158 (1978) p. 277-293.

"Properties of Amorphous Fluoropolymers based on 2,2-bitrifluoromethyl-4, 5-difluoro-3, 3-dioxle", Buck et al. 183rd Meeting of the Electrochemical Society, Honolulu, HI, May 17, 1993.

"Applications of membranes in Industry: Glass Fluoropolymer Membranes", Nemser, Compact Membrane Systems, Inc., 21st Aharon Katzir-Katchalsky Conference, Sep. 1993, Rehovot, Israel.

Search Report and Written Opinion in PCT Application No. PCT/US14/26680 filed by Bio-Rad Laboratories, Inc. dated Jul. 14, 2014.

* cited by examiner

FLUID DEGASSING APPARATUS

CROSS-REFERENCE TO RELATED APPLICATIONS

This application is a continuation of U.S. patent application Ser. No. 13/611,420, filed on Sep. 12, 2012 and entitled "SUPERSATURATED FLUID DEGASSING," which itself claims priority to U.S. Provisional Patent Application Ser. No. 61/533,429, filed on Sep. 12, 2011 and entitled "SUPERSATURATED FLUID DEGASSING," the content of which being incorporated herein in its entirety.

FIELD OF THE INVENTION

The present invention relates generally to systems for degassing fluids from pressurized vessels, including for degassing pressurized fluidic reagents used for microfluidic systems, inks, semiconductor processing fluids and laboratory grade fluids. A flow-through transfer line degassing apparatus includes transfer lines which simultaneously act to passively degas fluids passing therethrough utilizing the driving force provided by the concentration differential between the pressurization gas and the atmospheric concentration of the pressurization gas, and to protect a degassing membrane from physical damage. The present transfer lines also exchange vapors and gasses with the atmosphere, and specifically permit vapor diffusion out from the degassing chamber.

BACKGROUND OF THE INVENTION

There are many chemical applications, particularly analytical applications such as those involving the use of microfluidic analytical devices known as chips and the like, which involve the use of pressurized liquid solvents, aqueous reactants and the like delivered to a microfluidic reaction system or chip to perform a desired analysis. Microanalyses generally use small amounts of reagents and thus allows the use of costly reagents and techniques not otherwise economically feasible. Examples of such microfluidic systems are increasingly found and used for hematology, cytometry, DNA analysis and other such analysis systems. The goals of microfluidic systems include reduced reagent use, reduced size of the sample needed to generate a signal for analysis, reduced footprint of the instrument, improved sample throughput and reduced cost per analysis. To achieve these goals, microfluidics systems typically utilize fluid passageways ranging from 1 to 100 microns in diameter, and which may be shaped to fit a desired manufacturing technique. It is commonly observed in such small devices containing small diameter fluid pathways and correspondingly small sensors that air bubbles can be trapped within the fluidics thereby occluding a region on a sensor or blocking a portion of the flow path.

Various approaches have proven successful in preventing the formation of bubbles, including the use of degassing devices such as those shown in U.S. Pat. Nos. 5,340,384, 7,144,443, 6,949,132 and 7,713,331, the contents of which being incorporated herein by reference. While each of these devices may at least optionally employ a vacuum to degas the fluid passing therethrough, the goals of the microfluidic system designer may be such that the use of a vacuum pump is undesirable. Additionally, the design goals of the same designer may be such that the use of a pumping system which directly contacts the reagent pathway is also undesirable. Microfluidic analysis systems are typically designed with pressurized containers containing the reagents required for the analysis, although a vacuum may also be used to draw fluids from their respective containers. Early examples of such pressurized systems are contained in U.S. Pat. Nos. 4,994,180 and 4,598,049 wherein a pressurized gas is used to deliver solvent to a liquid chromatographic pumping system and reagents to a DNA synthesizer, respectively.

In the instance wherein a gas pressurized system is used to provide the motive force to enable fluidic flow to a microfluidic system or chip, the fluid generally becomes supersaturated by the gas being used to pressurize the fluid. Supersaturation may be treated through costly means such as multiple layer bags with a near-zero permeability wherein the gas pressurization is provided external to the bag, or by mechanical pressure applied to the fluid. Gas-impermeable bags are generally manufactured from multiple layers of various plastics and may also involve the use of metal-coated layers to limit gas permeation to acceptable levels. Such reagent bags are single-use, they contribute to the cost of every analysis, and may be limited to short exposures to pressurization by gas before the contents become supersaturated with the pressurization gas. Mechanical pressurized systems are not widely used due to sealing considerations between the driving means and the fluid. As described in U.S. Pat. No. 4,133,767, outgassing of atmospheric pressurized liquids was found to be limited if such solvents were sparged of dissolved atmosphere using helium as a sparging gas. One could speculate that due to the low solubility of helium in fluids such as common solvents and water, simple overpressurization of reagents by the use of helium may be used. However, other concerns regarding the use of helium arise. First, helium quickly supersaturates the pressurized fluid, and although of limited solubility, helium nevertheless forms bubbles when the fluid is exposed to a lower pressure. Secondly, helium is of limited availability, expensive and requires bulky containers. Thirdly, many of the desired chemical reactions in microfluidic systems are accelerated or inhibited by the exclusion of oxygen that may be brought about by helium or other inert gas pressurization. The use of a membrane to release the supersaturation gas to the atmosphere and to achieve near-equilibrium concentrations of dissolved atmosphere in the pressurized fluid is advantageous in that it retains the driving force provided by the gas pressurization of the reagents yet removes much of the supersaturation of the fluid by the pressurization gas.

Conventional degassing systems do not well accommodate the transport and condensation of the liquid vapors permeating through the membrane into the space between the membrane and the outer impermeable shell (the degassing chamber). Instead, the transport of vapors out from the degassing chamber is performed by the application of a vacuum and/or a sweep gas. Without active removal of the vapors accumulating in the degassing chamber, temperature changes may cause a build-up of condensate within the degassing chamber. Condensate build-up can block the free flow of dissolved gasses through the membrane into the degassing chamber by occluding part or all of the membrane surface. In the extreme, a liquid-gas contactor can become "flooded" and cease functioning as a gas-permeable barrier altogether. Condensate build-up can also cause mechanical interference with the action of the vacuum pump. Condensate is typically removed from conventional systems by a purge gas port or by allowing air to enter the fluid side of the membrane to provide sufficient air flux to purge the permeate side of the membrane. The practice of condensate removal requires some external means of applying gas flow to the degassing chamber.

While conventional degassing systems employ mechanisms and/or processes through which condensate may be removed from the degassing chamber, certain degassing applications do not employ the mechanisms of conventional systems necessary to purge and/or dilute condensate vapors in the degassing chamber. For example, certain degassing applications do not employ a pumping system, either in the form of a vacuum pump or a sweep fluid pump. Moreover, a mechanism for introducing external gas flow to the permeate side of the membrane may not be available or desired. In such circumstances, a mechanism is needed to remove the permeation vapors from the degassing chamber. Preferably, such a mechanism does not substantially add to the cost or complexity of typical shell and tube degassers.

SUMMARY OF THE INVENTION

By means of the present invention, gas-pressurized fluids may be operably degassed in distinct transfer lines extending between respective components in an associated fluid flow system. The transfer lines of the present invention are preferably configured as axially-disposed individual degassing units having an elongated gas-permeable outer tube and one or more permeable or semi-permeable inner tubes disposed therewithin. The outer and inner tubes in combination may be sufficiently flexible so as to be readily manipulatable into desired configurations. Alternatively, a porous containment surrounding the semi-permeable inner tubes may be constructed such that it forms a porous container protecting the inner semi-permeable membrane(s).

The inner tubes may be constructed from: (a) porous hollow fiber structures wherein the porous material resists liquid penetration by virtue of hydrophobic interaction with the pores; (b) permeable materials in which the transport mechanism of gas and liquid vapors through the membrane wall is governed by the solution-diffusion mechanism; or (c) a combination of the two. Porous structures may be made from any number of materials such as polyvinyldiene fluoride, polytetrafluoroethylene, polypropylene, polymethyl pentene, and many other commercially available materials. Such materials are generally considered for use in water or aqueous systems and are not typically used with organic solvents such as alcohols, alkanes or other organic solvents. The porous structures of the inner tubes typically employ pore sizes in the 3 to 500 nanometer range so as to resist the penetration of water under pressure regimes commonly employed in fluid transfer systems.

In other embodiments, the fluid conductive inner tube may form a permeable, non-porous structure from materials such as silicone rubber wherein the barrer value of the structure is from 1 to 200 barrer or higher for oxygen or nitrogen, and in which the permeance is sufficient to permit suitable gas transport from the fluid for degassing within a reasonable surface area of the permeable membrane. The permeable non-porous structure may also or instead be formed from inert permeable fluoropolymers, such as those available from DuPont under the trade name Teflon® AF, wherein the barrer value of the structure is from 100 to 1000 for oxygen and nitrogen. Using relatively high barrer value membranes permits a reduction in membrane surface area without sacrificing degassing performance. Fluoropolymers such as Teflon® AF 2400 may present a preferred material to fabricate the non-porous, permeable structure to transport and degas organic solvents. Additionally, aqueous reagent systems which contain detergents may be safely transported and degassed using the permeable non-porous inner tubes described herein.

The inner tubes provide the conduit for fluids and resist penetration by liquids while allowing the transport of gas across the wall of the tube from a higher respective gas concentration to a lower respective gas concentration. Such inner fluid transport tubes may comprise a thin wall of material which can be manufactured and handled during assembly. An outer shell is placed over the relatively fragile inner fluid transport tubes not only to provide an environment to which gas transport may be driven for degassing, but also to provide protection from physical damage to the inner membranes through which the fluid is transported. A porous protective sheath or shell allows passive transport of permeated solvent vapors into the atmosphere. Prior art utilizes active transport of these permeating or evaporating vapors by utilizing a purge gas or atmosphere to sweep these permeating vapors from the degassing chamber and hence into the atmosphere. In this manner, concentrations of solvent vapors may be kept below the level at which they may condense within the shell, blocking the transport of air across the membrane from the fluid.

The present invention utilizes a porous outer shell which provides both a desired level of mechanical protection to the fragile inner gas permeable or porous degassing membranes as well as a pathway and mechanism for passive gas and vapor transport out from the degassing chamber. The porous outer shell may be manufactured of a material inert to reaction with vapors operably transported through the pores, and with pore sizes from 100 to 500 nanometers or more and may be constructed such that the pores may communicate fully through the wall of the shell. It is also desirable that the pores be isolated one from the other in a manner such that movement of gas or fluid is limited to radial passage through the wall, and is limited to axial transport through the wall by the length of the pore.

For the purposes of the present invention, the permitted vapor transport rate defined as the permeance through the wall of the outer shell is preferably greater than the collective permitted transport rate (permeance) of the vapor through the respective walls of the inner tubes. Thus, a mechanism of transport exists which prevents vapor buildup inside the degassing chamber. In this manner, the rate of exchange of vapors permeating through the inner tubes is lower than the rate of exchange of these same vapors through the wall of the outer shell. As the outer shell is porous and preferably inert to solvents and sized to fit the desired outside and inside diameter, the transport of a small molecule such as water vapor can be used to calculate the relationship between the permeation through the inner tube and thence from the degassing chamber through the pores of the outer shell.

The mechanism of gas diffusion in small pores depends on the Knudsen number, which is defined as the ratio of the mean-free path of the gas molecules to the pore diameter. When the mean-free path is much smaller than the pore size, the Knudsen number is small and diffusion is the result of random collisions between different molecules. In this case, the diffusion coefficient D varies inversely with pressure, but is independent of pore size.

The situation when the mean-free path is much larger than the pore diameter is different. In such case, wherein the Knudsen number is relatively large, diffusion is the result of collisions between the diffusing gas and the walls of the pores. The diffusion coefficient D for this case of "Knudsen diffusion" is now given by $$D_{Kn} = \frac{d}{3}\left[\frac{2k_B T}{\tilde{m}}\right]^{1/2}$$

where d is the pore diameter, $k_B$ the Boltzmann's constant, T the temperature, and $\tilde{m}$ the molecular weight (Equation 1). Thus, the Knudsen diffusion coefficient in this scenario is independent of pressure.

To calculate the mean-free path of different gases, the following equation is used:

$$l = \frac{4k_B T}{\pi \sigma^2 p}$$

where $\sigma$ is the collision diameter of the gas and p is the pressure (Equation 2).

At 25° C. and 1 atm, the free-mean path for water vapor is about 740 nm, for nitrogen about 360 nm, and for oxygen about 430 nm.

For the case of a Poridex wall material with an average pore size of 200 nm and an average pore length (film thickness) of 300 μm, the Knudsen numbers for water vapor, nitrogen and oxygen are 3.7, 1 the diffusion coefficients for water vapor, nitrogen and oxygen are $4.2 \times 10^7$ barrer, $3.37 \times 10^7$ and $3.15 \times 10^7$ barrer, respectively.

If the pore is not straight, it will have a tortuous factor T. Considering the void fraction of the Poridex polymer film, the diffusion coefficient becomes (Equation 3):

$$D = \frac{D_{Kn} \times \varepsilon}{\tau}$$

Because tortuosity is undefined, we only consider the case wherein the pore is straight. Relating the barrer value for materials to the permeance requires conversion of the barrer value to a unit thickness. As the permeance measures the actual rate of flow of a gas or a vapor through the membrane wall, the relationship between the permeance of the inner conveyance member and the permeance of the outer shell is preferably such that the permeance of the outer shell is greater than that of the inner conveyance member.

$$Permenace\ (GPU) = \frac{D}{L}$$

Wherein D is in units of barrer, and L is in units of microns.

As illustrated above, in the example case when the inner tube is manufactured from Teflon® AF with a wall thickness of 125 microns wherein the barrer value for water is $4 \times 10^3$ and for oxygen and nitrogen are 0.9 and $0.4 \times 10^2$ respectively, the permeance is 32 GPU for water vapor, 7.2 GPU for oxygen, and 3.2 for nitrogen. In an example outer shell having a wall thickness of 380 microns and a barrer value of about $3.5 \times 10^7$, the permeance is about 90,000 GPU without accounting for the difference of surface area in which the outer shell has a larger surface area per unit length than the inner conveyance member. Thus, the limit of permeability is the solution-diffusion of air and vapor through the wall of the inner tube. It can be seen that the diffusion rate through the wall of the outer shell is at least 4 or 5 orders of magnitude higher than the diffusion rate of any vapor permeating through the wall of the inner tube membrane comprised of, for example, Teflon® AF. The excess exchange with the atmosphere for similar porous wall thicknesses is the ratio of the inner surface areas of both tubes. In an example embodiment, the inside diameter of the inner tube is 0.85 mm and the inside diameter of the outer shell is approximately 2 millimeters. Hence the diffusion rate from the outer shell is preferably at least 2.2 times greater than pure gas diffusion through the inner tube in order to maintain a clear degassing chamber. Given the relative characteristics of the inner tube and outer shell, a more restrictive limit is imposed on the rate at which air and water vapor diffuse through the wall of the inner tube by the diffusion rate of gas through the water (liquid), in comparison to the permeation rate through the wall of the outer shell. Thus, in the above example embodiment, the ratio of gas flow through the inner tube into the degassing chamber to the gas flow through the wall of the outer shell is at least 1:2.2. As the purpose of the outer shell is both to protect the inner tube and to allow near-free exchange of vapor with atmosphere and thus prevent solvent concentrations building sufficiently to allow condensation upon temperature change, the present arrangement minimizes condensation potential for aqueous and solvent systems alike.

DETAILED DESCRIPTION OF THE PREFERRED EMBODIMENTS

The objects and advantages enumerated above together with other objects, features and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
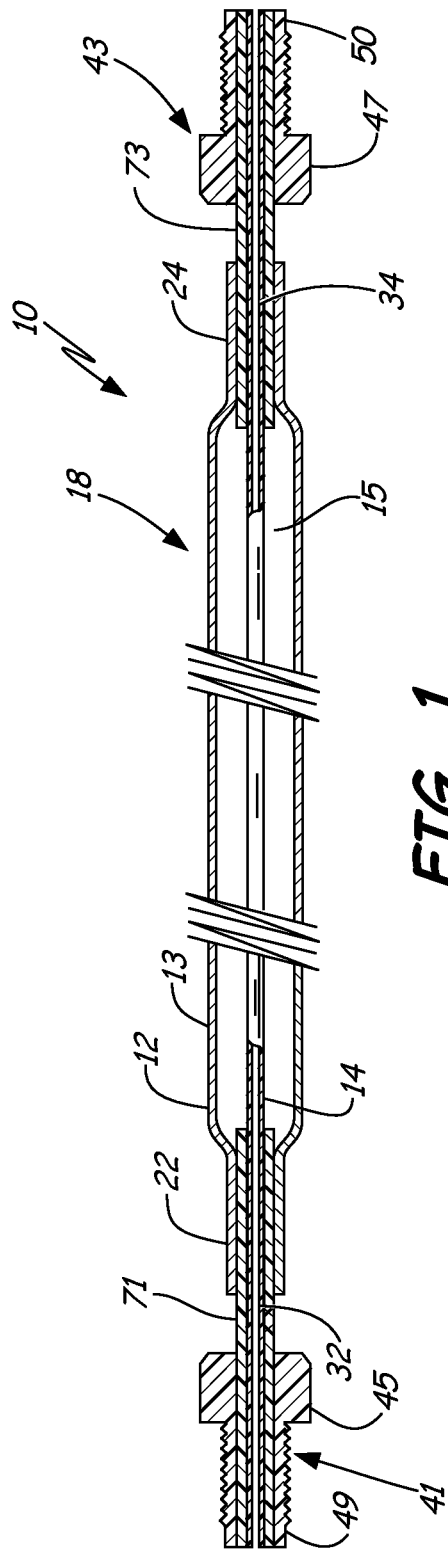
FIG. 1 is a cross-sectional view of a fluid treatment apparatus of the present invention.

With reference now to the drawings, and first to FIG. 1, a flow through fluid treatment apparatus 10 of the present invention includes an outer shell 12 and an inner conveyance member 14 disposed within outer shell 12. In one embodiment, outer shell 12 defines a first chamber 15 therewithin, and through which inner conveyance member 14 extends.

In the illustrated embodiment, outer shell 12 includes an inlet end 22 and an outlet end 24, with inner conveyance member 14 having a corresponding inlet portion 32 and an outlet portion 34. Inlet and outlet junctions 41, 43 are preferably operably coupled to respective inlet and outlet ends 22, 24 of outer shell 12, and to inlet and outlet portions 32, 34 of inner conveyance member 14. Inlet and outlet junctions 41, 43 may be configured so as to operably provide a coupling of outer shell 12 to inner conveyance member 14.

Outer shell 12 is preferably a porous structure having a porosity communicating first chamber 15 to an exterior environment through a wall 13 thereof. In one embodiment, porous wall 13 of outer shell 12 may have a nominal pore size of about 200 micrometers, with a mean distribution of 100-300 micrometers. Typically, outer shell 12 is porous to an extent that it is substantially non-selective for gasses or vapors permeating through inner conveyance member 14. It is also anticipated that outer shell 12 exhibits a greater permeance than that of inner conveyance member 14, so that gasses or vapors permeating through inner conveyance member 14 readily escape through wall 13 of outer shell 12, and do not collect and/or condense within first chamber 15. An example permeance ratio of outer shell 12 to inner conveyance member 14 may be at least about 5:1. In one embodiment, the permeance ratio of outer shell 12 to inner conveyance member 14 is 1,000:1.

Example materials for the fabrication of outer shell 12 include expanded PTFE, PVDF, and PFA, with an example material density of 1.6 g/cm$^3$. The wall thickness of wall 13 of outer shell 12 may typically range from 0.006-0.125 inches, depending upon the specific application, and with an example wall thickness of 0.06 inch. In addition to providing a porous structure, the materials, porosity, and wall thicknesses of outer shell 12 may typically be selected to provide mechanical protection to inner conveyance member 14. For the purposes hereof, the term "mechanical protection" or "mechanically protective" is intended to mean a body that is capable of preventing physical damage or undesired deformation such as abrasion or kinking to inner conveyance member 14 in product assembly, shipment, and/or operation. Therefore, outer shell 12 may be manufactured to suitably mechanically protect inner conveyance member 14 during its intended life cycle in fluid treatment apparatus 10. In addition to being mechanically protective, outer shell 12 is preferably flexible to permit bending of outer shell 12 (and inner conveyance member 14) without kinking or breaking. The flexibility of outer shell 12 permits a user to manually shape apparatus 10 without tools. In some embodiments, outer shell 12 is configured as a tube which may be coaxially or non-coaxially positioned about inner conveyance member 14. Non-tubular configurations for outer shell 12, however, are also contemplated as being useful in the present invention.

Inner conveyance member 14 forms a separation membrane barrier to operably separate a gas from a liquid, and is therefore preferably gas-permeable and liquid-impermeable. Moreover, inner conveyance member 14 may be relatively inert and flexible to convey fluid, such as a gas supersaturated fluid (relative to atmospheric pressure concentration) through first chamber 15 of fluid treatment apparatus 10. A variety of materials may be utilized in the gas-permeable, liquid-impermeable barrier performing the separations contemplated by the present invention. In some embodiments, fluorinated polymeric material variants may be utilized alone or in combination with one another, and/or with other materials to form the separation membrane. Example materials that may be useful in the gas-permeable, liquid-impermeable membrane barrier of the present invention include expanded PTFE, silicone rubbers and silicone rubbers coated on substrates, fluorinated copolymers, amorphous fluorinated copolymers, and the like.

In some embodiments, the gas-permeable, liquid-impermeable conveyance member 14 may be formed as a primarily non-porous structure. Generally speaking, non-porous structures are substantially free of "through-pores", and act to separate primarily through a sorption-diffusion mechanism. Such separation may be, for example, a gas from a liquid. Although substantially non-porous separation membranes may be fabricated from a variety of materials and material combinations, one example class of materials found by the Applicants to be useful in certain arrangements is fluorinated material, such as fluorinated copolymer materials. One particular material that has been utilized by the Applicant is an amorphous perfluorinated copolymer available from E.I. DuPont de Nemours under the trade name Teflon® AF. Applicants believe, however, that a host of other polymeric and non-polymeric materials may be useful as the separation media in the present arrangement.

While the separation media referred to herein is preferably gas-permeable, liquid-impermeable, it is to be understood that separation media that are not completely gas-permeable, and/or are not completely liquid-impermeable may be equally useful in the arrangements of the present invention. Accordingly, it is to be understood that the terminology "gas-permeable, liquid-impermeable" utilized herein includes materials that are not completely gas-permeable, and/or not completely liquid-impermeable.

Inner conveyance member 14 may be in the form of one or more tubes extending through first chamber 15. However, it is contemplated that inner conveyance member 14, which may include more than a single body, may be provided in formations other than tubular. Accordingly, the separation barriers referred to herein as the "inner conveyance member" may take on a variety of configurations, including one or more tubular or non-tubular bodies.

In some embodiments, the gas-permeable, liquid-impermeable membrane may be extruded or otherwise formed as a monolithic, free-standing tube that does not require support structures along its length to remain viable in a wide range of operating conditions. For example, the gas-permeable, liquid-impermeable membrane of inner conveyance member 14 may have a wall thickness of about 0.003-0.015 in. It is contemplated that, at least in some embodiments, inner conveyance member 14 is insoluble in the liquid to be degassed, and exhibits a permeance of at least 1 GPU, and more preferably between 8-1,000 GPU. In practice, the desired permeance is obtained using equations related to the level of gas saturation in the liquid, system pressure, the desired volume and liquid flow rate expected, chemistry, and the like.

A variety of configurations for inlet and outlet junctions 41, 43 are contemplated by the present invention. In the embodiment illustrated in FIG. 1, inlet and outlet junctions 41, 43 include dual-shrink tubing 71, 73 disposed in surrounding relationship to respective inlet and outlet portions 32, 34 of inner conveyance member 14. Such tubing sections 71, 73 are preferable heat shrunk about respective portions of inner conveyance member 14, while inlet and outlet ends 22, 24 of outer shell 12 are preferably sealingly engaged with an outer surface of respective tubing section 71, 73 so as to obtain a sealed engagement between outer shell 12, respective tubing sections 71, 73, and inner conveyance member 14. Inlet and outlet junctions 41, 43 may further include nuts 45, 47 in conjunction with a pair of ferrules 49, 50, and which, in combination, are formed in surrounding relationship to tubing sections 71, 73 for connecting apparatus 10 between respective system components.

Figure 2:
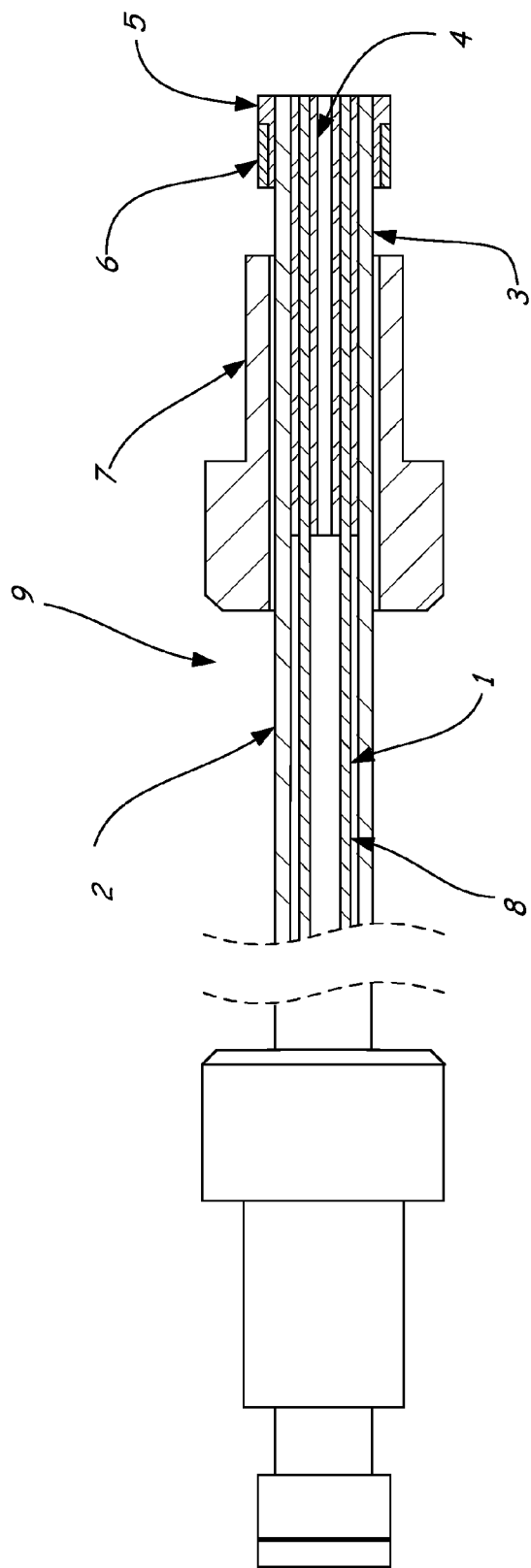
FIG. 2 is a schematic illustration of a fluid treatment apparatus of the present invention.

Another embodiment of the present invention is illustrated in FIG. 2, wherein fluid treatment apparatus 9 includes an outer tube 2 and an inner tube 1 disposed within outer tube 2. As illustrated, outer tube 2 preferably forms an elongated porous chamber through which inner tube 1 extends. Outer tube 2 serves both as a protective, flexible sheath, and as a porous structure through which vapors and gasses may escape from degassing chamber 8 between outer tube 2 and inner tube 1. A junction device 7 is utilized to connect to fluid couplings through which fluid is passed into an inlet of inner tube 1. Ferrule 5 and sealing ring 6 may be used to compressively seal outer tube 2 against a mating sleeve 3, and further against inner tube 1 upon retention tube 4 so as to form a liquid-tight seal. A duplicate or similar connection scheme may be employed at the outlet end of inner tube 1. A fluidic seal between the components is formed by ferrule 5 and sealing ring 6 to prevent liquid from entering degassing chamber 8 between inner tube 1 and outer tube 2.

Figure 3:
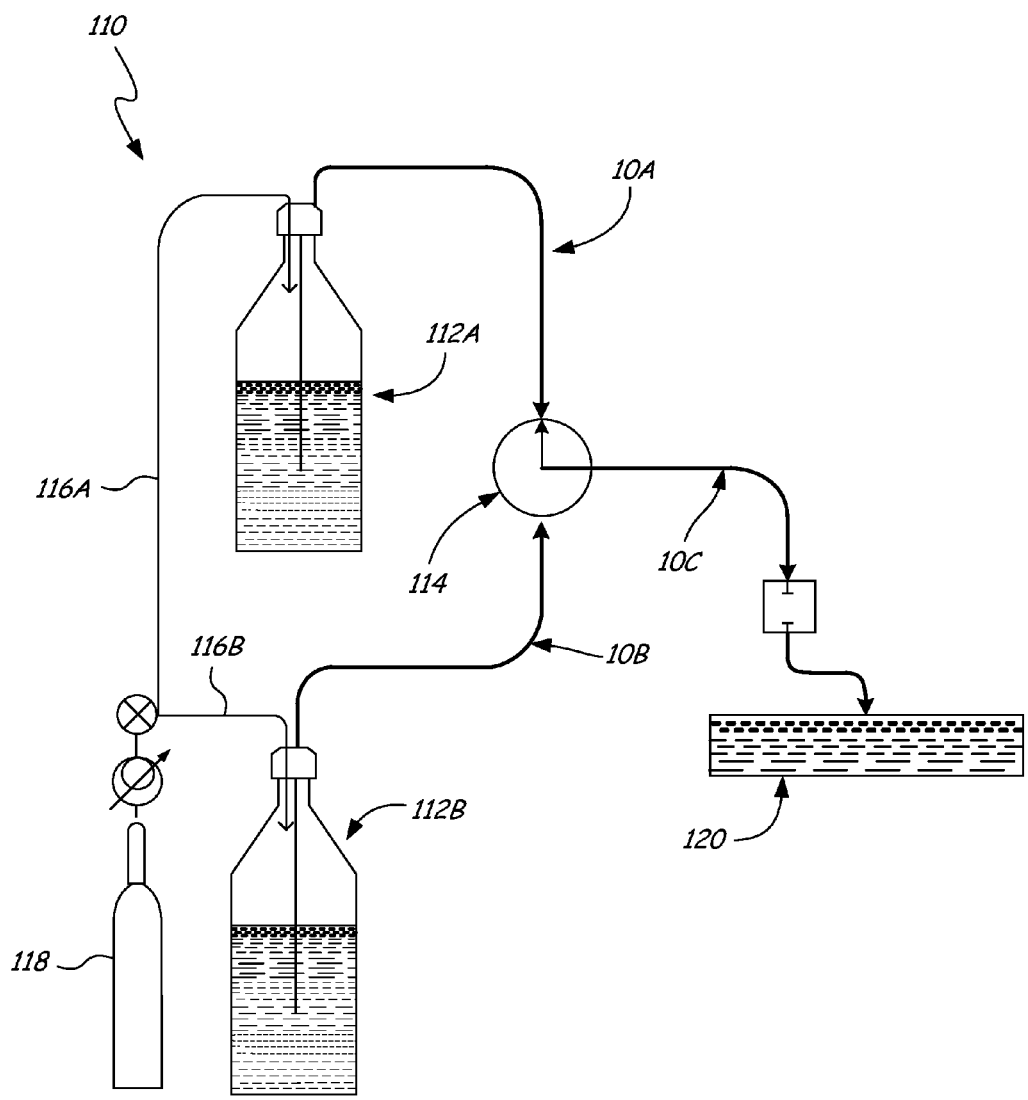
FIG. 3 is a schematic diagram of a fluidics system employing a fluid treatment apparatus of the present invention.

An example system in which the fluid treatment apparatus of the present invention may be employed is illustrated in FIG. 3. Fluidics transfer system 110 incorporates first and second fluid treatment apparatus 10A, 10B coupled between respective pressurized fluid vessels 112A, 112B and a stream selector valve 114. Pressurized fluid vessels 112A, 112B are pressurized with a gas that is supplied thereto through respective gas lines 116A, 116B, and sourced from a gas tank 118. The pressurized gas supplied to vessels 112A, 112B generates a motive force to direct fluid from within vessels 112A, 112B through respective fluid treatment apparatus 10A, 10B to stream selector valve 114. The fluid motivated through fluid treatment apparatus 10A, 10B includes a liquid and the gas supplied through gas lines 116A, 116B, wherein the gas is supersaturated in the liquid to exert a first partial pressure in the fluid that is greater than a second partial pressure exerted by such gas in the exterior environment.

As the supersaturated fluid is conveyed through respective first chambers 15 within respective inner conveyance members 14, Henry's law of partial pressure governs the degassing of such fluids to near atmospheric concentrations of the gas within the fluid conveyed by the inner conveyance member. The degassing occurs by the subject gas passing through the gas-permeable, liquid-impermeable wall of inner conveyance member 14, and subsequently out through the pores of wall 13 of outer shell 12. In such a manner, pressure on the fluid caused by the pressurization in vessels 112A, 112B is maintained, but the elevated concentration of gas developed as a result of such pressurization is removed to eliminate the supersaturation of such gas in the liquid. It is also to be understood that should the pressurization gas from tank 118 be other than air, air may seek to resaturate the fluid flowing through inner conveyance member 14 according to Henry's law of partial pressures. Such re-saturation of atmospheric air may occur to an extent consistent with the residence time and the permeance of inner conveyance member 14.

An additional fluid treatment apparatus 10C may be provided downstream from stream selector valve 114 to convey and further degas fluid from stream selector valve 114 prior to outlet to the destination fluidics 120 of system 110.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. An apparatus for degassing a fluid having a liquid and a target gas, said apparatus comprising:
    a first porous barrier separating a first chamber from an environment, said first barrier having a porosity communicating said first chamber to the environment, wherein said porosity provides for a first permeance to the target gas; and
    a second non-porous, gas-permeable barrier separating said first chamber into a retentate side and a permeate side, said second barrier being arranged for contacting the fluid at said retentate side, and providing for a second permeance to the target gas, wherein a ratio of said first permeance to said second permeance is between 5:1 and 1000:1.

2. An apparatus as in claim 1 wherein said second barrier is a tube with a lumen defining said retentate side of said first chamber.

3. An apparatus as in claim 2 wherein said first barrier is configured as a sheath surrounding said tube.

4. An apparatus as in claim 1 wherein the environment is at atmospheric pressure.

5. An apparatus for degassing a fluid having a liquid and a target gas, said apparatus comprising:
    an outer tube having a first lumen defining a first chamber, and a porous first wall surrounding the first lumen;
    an inner tube disposed in said first chamber and having a second lumen defining a second chamber, and a non-porous, gas-permeable second wall surrounding the second lumen.

6. An apparatus as in claim 5 wherein said outer tube encases said inner tube.

7. An apparatus as in claim 5 wherein said second wall separates said first and second chambers.

8. An apparatus as in claim 7 wherein said inner tube is arranged to maintain a continuous radial gap between said first and second walls.

9. A method for degassing a fluid having a liquid and a target gas, said method comprising:
    (a) providing the apparatus of claim 5; and
    (b) passing the fluid through the second chamber to permit the gas to permeate through the second wall.

10. A method as in claim 9 wherein the first chamber is at atmospheric pressure.

* * * * *